US009364985B2

(12) United States Patent
Desai et al.

(10) Patent No.: US 9,364,985 B2
(45) Date of Patent: Jun. 14, 2016

(54) PROCESS FOR PREPARING FLOWABLE AMORPHOUS POLY-ALPHA OLEFIN ADHESIVE PELLETS

(71) Applicant: Henkel IP & Holding GmbH, Duesseldorf (DE)

(72) Inventors: Darshak Desai, Edison, NJ (US); Yuhong Hu, Belle Mead, NJ (US); Ken Gaspar, Greer, SC (US); Ed Hantwerker, Drums, PA (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 436 days.

(21) Appl. No.: 13/803,814

(22) Filed: Mar. 14, 2013

(65) Prior Publication Data

US 2013/0317193 A1 Nov. 28, 2013

Related U.S. Application Data

(60) Provisional application No. 61/651,197, filed on May 24, 2012.

(51) Int. Cl.
| | |
|---|---|
| *B29C 47/88* | (2006.01) |
| *B29B 9/06* | (2006.01) |
| *B29C 47/00* | (2006.01) |
| *C08F 10/08* | (2006.01) |
| *B29C 47/92* | (2006.01) |
| *B29K 105/00* | (2006.01) |
| *B29C 35/16* | (2006.01) |
| *B29C 71/00* | (2006.01) |
| *B29B 9/16* | (2006.01) |
| *C08J 3/12* | (2006.01) |

(52) U.S. Cl.
CPC .............. *B29C 47/0011* (2013.01); *B29B 9/06* (2013.01); *B29C 47/92* (2013.01); *C08F 10/08* (2013.01); *B29B 9/065* (2013.01); *B29B 9/16* (2013.01); *B29B 2009/165* (2013.01); *B29C 47/0004* (2013.01); *B29C 47/0014* (2013.01); *B29C 47/0066* (2013.01); *B29C 47/8815* (2013.01); *B29C 47/8895* (2013.01); *B29C 71/0063* (2013.01); *B29C 2035/165* (2013.01); *B29C 2035/1616* (2013.01); *B29C 2035/1625* (2013.01); *B29C 2035/1675* (2013.01); *B29C 2793/0027* (2013.01); *B29C 2947/92704* (2013.01); *B29C 2947/92714* (2013.01); *B29C 2947/92761* (2013.01); *B29K 2105/0097* (2013.01); *C08J 3/124* (2013.01)

(58) Field of Classification Search
None
See application file for complete search history.

(56) References Cited

U.S. PATENT DOCUMENTS

| | | | |
|---|---|---|---|
| 4,233,432 A | 11/1980 | Curtis, Jr. | |
| 4,265,976 A | 5/1981 | Nowak | |
| 5,041,251 A | 8/1991 | Coe et al. | |
| 5,119,570 A * | 6/1992 | Russemeyer et al. | 34/363 |
| 5,171,628 A | 12/1992 | Arvedson et al. | |
| 5,256,717 A | 10/1993 | Stauffer et al. | |
| 5,331,033 A | 7/1994 | Stauffer et al. | |
| 5,397,843 A | 3/1995 | Lakshmanan et al. | |
| 5,403,528 A | 4/1995 | Fowler | |
| 5,611,983 A * | 3/1997 | Ma et al. | 264/142 |
| 5,811,472 A | 9/1998 | Patel | |
| 6,067,776 A * | 5/2000 | Heuer | C08J 3/124 53/435 |
| 6,120,889 A * | 9/2000 | Turner et al. | 428/221 |
| 6,120,899 A * | 9/2000 | Cameron et al. | 428/407 |
| 6,586,536 B1 * | 7/2003 | Kelley | 526/64 |
| 6,686,008 B1 | 2/2004 | Merlin et al. | |
| 6,716,527 B1 * | 4/2004 | Czmok et al. | 428/403 |
| 6,833,404 B2 | 12/2004 | Quinn et al. | |
| 6,900,252 B2 | 5/2005 | Khudyakov et al. | |
| 7,012,057 B2 | 3/2006 | Kapoor et al. | |
| 7,192,688 B2 | 3/2007 | Klang et al. | |
| 7,232,535 B1 * | 6/2007 | Somers | B29C 47/06 264/148 |
| 7,250,486 B1 * | 7/2007 | McGehee | 528/308 |
| 7,462,651 B2 | 12/2008 | Cao et al. | |
| 7,533,780 B2 | 5/2009 | Daugherty, Jr. | |
| 7,776,242 B2 * | 8/2010 | Sato et al. | 264/14 |
| 8,298,460 B2 * | 10/2012 | Doll et al. | 264/5 |
| 8,303,871 B2 * | 11/2012 | Boothe et al. | 264/142 |

(Continued)

FOREIGN PATENT DOCUMENTS

| | | |
|---|---|---|
| KR | 20020095070 A | 12/2002 |
| WO | 9709393 A1 | 3/1997 |
| WO | 2009012291 A1 | 1/2009 |

OTHER PUBLICATIONS

Eastotac Hydrocarbon Resins Brochure by the Eastman Company (Aug. 1992).
Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (Technomic Publishing Company, Inc., 1989) p. 43.

(Continued)

Primary Examiner — Jeffrey Wollschlager
(74) Attorney, Agent, or Firm — Sun Hee Lehmann

(57) ABSTRACT

The present invention relates to a process for producing free-flowing, agglomeration resistant amorphous poly-alpha-olefin based adhesive pellets. The process includes (a) extruding the adhesive through an orifice of a die plate immersed in a cooling fluid; (b) cutting the adhesive into a plurality of pellets in the cooling fluid; (c) solidifying the pellets at a temperature range of about 25° C. to about 40° C. for at least 30 minutes; and (d) separating the pellets from the recrystallization fluid and drying the pellets. The pellets harden at least three folds faster than conventionally formed pellets.

10 Claims, 4 Drawing Sheets

(56) References Cited

U.S. PATENT DOCUMENTS

| | | | |
|---|---|---|---|
| 8,955,294 B2* | 2/2015 | Free | B65B 1/46 53/111 R |
| 9,260,635 B2* | 2/2016 | Ravishankar | C09J 123/16 |
| 2004/0042750 A1 | 3/2004 | Gillberg et al. | |
| 2004/0143034 A1 | 7/2004 | Primke et al. | |
| 2006/0223937 A1 | 10/2006 | Herr et al. | |
| 2009/0121372 A1* | 5/2009 | Campbell | B29B 9/065 264/5 |
| 2009/0134537 A1* | 5/2009 | Eloo et al. | 264/14 |
| 2009/0203840 A1* | 8/2009 | Martin et al. | 525/50 |
| 2009/0223618 A1 | 9/2009 | Smith | |
| 2009/0273112 A1* | 11/2009 | Boothe et al. | 264/148 |
| 2010/0124607 A1* | 5/2010 | Berti | C08J 3/124 427/207.1 |
| 2010/0136355 A1 | 6/2010 | Van Den Abbeele Henk | |
| 2011/0027601 A1 | 2/2011 | Ruffner, Jr. et al. | |
| 2011/0138753 A1 | 6/2011 | Justice et al. | |
| 2011/0172382 A1* | 7/2011 | Yeh et al. | 526/282 |
| 2011/0302889 A1* | 12/2011 | Boothe et al. | 53/513 |
| 2012/0319318 A1* | 12/2012 | Wang et al. | 264/101 |

OTHER PUBLICATIONS

Young, R.J. & Lovell, P.A., Introduction to Polymers (2nd ed., Chapman & Hall, New York 1991), pp. 10-11, 292.

Handbook of Adhesives (ed. Irving Skeist, Van Nostrand Reinhold Co. 1977), pp. 495-498.

Kraus et al., Tack and Viscoelasticity of Block Copolymer Based Adhesives, J. Adhesion 10:221-36 (1979).

Eastman Chemical Brochure titled "World of Eastman Chemicals" dated Jan. 1989, Publication No. P-160F.

Eastman AQ Branched Polyesters Brochure dated Sep. 1997, Publication No. WA-62B.

Eastman Chemical Sales Brochure dated Feb. 1993, Publication No. WA-21.

Exxon Chemical Sales Brochure dated Mar. 1994.

Eastman Chemical Eastotac Hydrocarbon Resins dated Nov. 1994, Publication WA-3C.

Exxon Chemical Escorez Tackifiers Brochure dated Apr. 1992.

* cited by examiner

PROCESS FOR PREPARING FLOWABLE AMORPHOUS POLY-ALPHA OLEFIN ADHESIVE PELLETS

FIELD OF THE INVENTION

The present invention relates to a process for producing free-flowing, agglomeration resistant amorphous poly-alpha-olefin based adhesive pellets and the adhesive pellets manufactured from this process.

BACKGROUND OF THE INVENTION

Hot melt adhesives are often formed and packaged into solid blocks, e.g., pellets, chubs, pillows, and blocks. Solid blocks are preferred over powder for there is less risk associated with inhalation during loading and unloading, and convenience associated with storing and shipping them. It is also desirable for the adhesives to be provided in a form that can be stored and thereafter automatically transported and fed into the application devices in an application site. Free-flowing, agglomeration resistant free-flowing pellets are desirable to decrease disruption for end-use operators.

Conventional techniques to pelletize soft and tacky plastic materials, as described in U.S. Pat. No. 5,041,251, include extruding and cutting the materials in a cooling fluid, and the pellets remain in the cooling fluid for at least several hours to days. The pellets are separated from the cooling fluid and dusted with wax powder to impart nontackiness. Waxes typically have high crystallinity, and thus aid in free flowing.

Amorphous poly-alpha-olefin (APAO) based adhesives have low crystallinity, are inherently soft and tacky, and tend to agglomerate (block) into a huge mass at elevated temperatures. Agglomerated adhesives disrupt end-use operations because agglomerated mass must be forcibly re-dispersed. To prevent such agglomeration, APAO based adhesives are typically packaged in drums or as individual chubs, blocks and pillows with a protective packaging; or transported in cooled, insulated rail cars. Due to the above limitations, pellet adhesives are typically formed from high crystalline adhesives, such as ethylene vinyl acetates and high crystalline olefin based adhesives, and not from APAO based adhesives.

There is a need in the art for producing pellets of amorphous poly-alpha-olefin based adhesives in a faster throughput that resists agglomeration. The current invention fulfills this need.

BRIEF SUMMARY OF THE INVENTION

The invention provides processes for preparing agglomeration resistant adhesive pellets composed of amorphous poly-alpha-olefin polymers. The process includes (a) extruding the adhesive through an orifice of a die plate immersed in a cooling fluid, which has a temperature, T1, of less than about 45° F. (7.2° C.); (b) cutting the adhesive into a plurality of pellets in the cooling fluid; (c) solidifying the pellets in a recrystallization fluid, T2, which is higher than T1 by at least 30° F., for at least 30 minutes; and (d) separating the pellets from the recrystallization fluid and drying the pellets.

The resultant pellets are free-flowing and non-blocking, and can be stored and transported at temperatures of below 120° F. for prolonged time without agglomerating together.

Applicants have discovered that recrystallizing the pellets at a temperature range of about 25 to about 40° C. (77-104° F.) significantly increases the speed of adhesive recrystallization by from days to several hours. Applicants have also discovered that the resultant pellets have higher hardness characteristics than conventionally formed pellets by a factor of at least three folds.

DETAILED DESCRIPTION OF THE INVENTION

Figure 1:
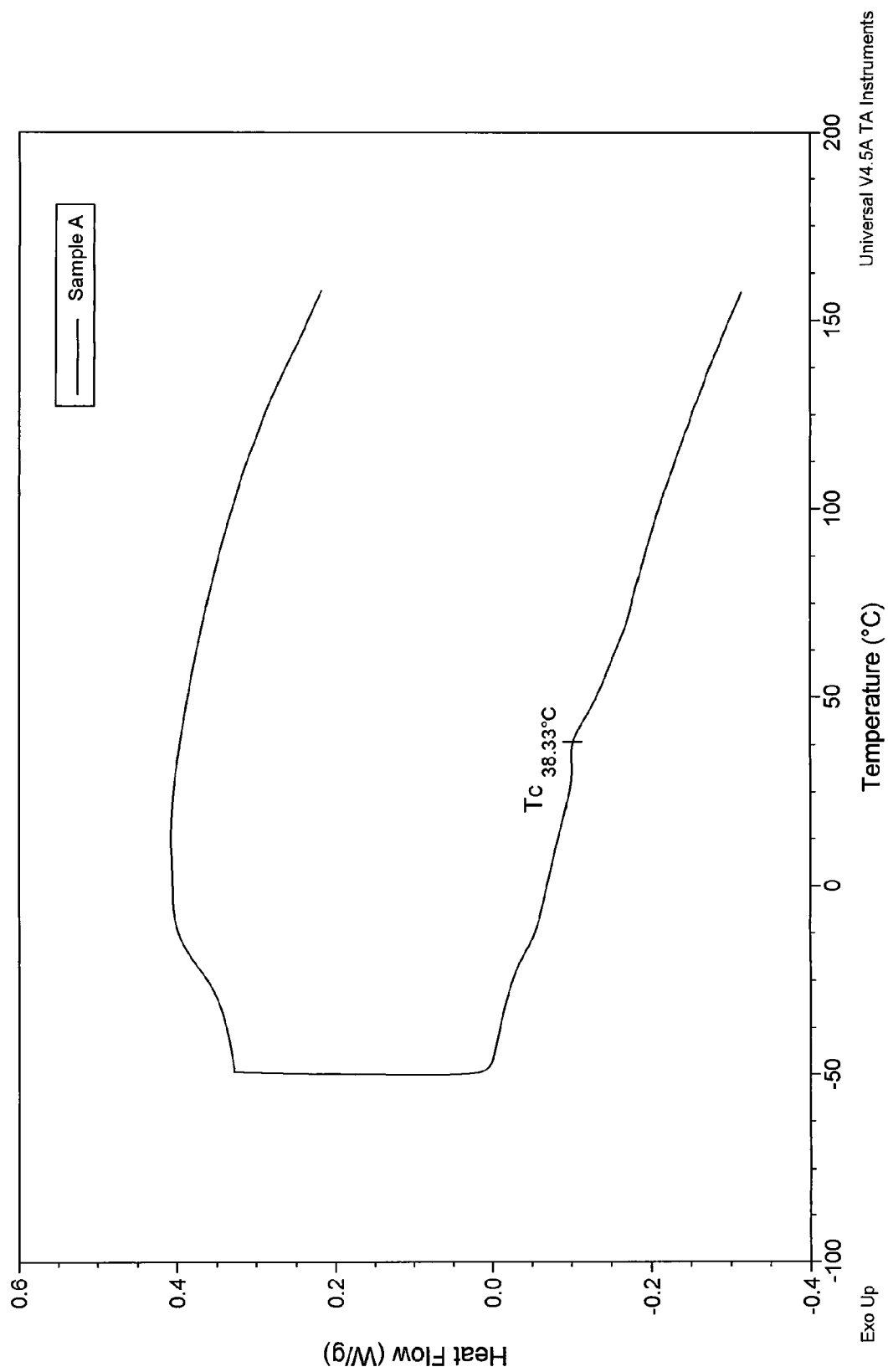
FIGS. 1A and 1B are DSC scans of adhesives.

The process for preparing agglomeration resistant pellet particles and pellet particles made from such process are described. The process yields pellets particles resistant to agglomeration, even at elevated storage and transportation temperatures, i.e., up to 120° F. Furthermore, the process yields pellet particles resistant to compression that may lead to caking into huge mass.

Certain adhesive composition have tendency to agglomerate in elevated storage and transportation temperatures, e.g., 120° F. Such adhesive composition comprises various components, and the majority is based on polymers such as polyolefins or styrenic block copolymers, such as SBS, SIS, SIBS, and blends thereof. As used herein, polymers represent homopolymers, copolymers, terpolymers or interpolymers.

Any adhesive that has a cold crystallization temperature, regardless of the crystalline or amorphous structure, may be utilized in the adhesive. It is preferable for the adhesive to comprise from about 30 wt % to about 90 wt % of an alpha-olefin polymer. In one embodiment, the polymer is greater than 50%, preferably 60% amorphous morphology. Polymers with amorphous morphology have a low degree of structural order, and this lacks of organization results in no visible crystallinity. In another embodiment, the polymer is greater than 30%, preferably 50% semi-crystalline morphology. Polymers with semi-crystalline morphology consist of both crystalline domains and amorphous domains. Preferably, the semi-crystalline polymer contains less than 30% percent crystallinity.

Polyolefins polymers include copolymers of $C_2$ to $C_{12}$. In one embodiment, polyolefin comonomer is composed of ethylene, propylene, butene, hexane, 4-methyl-1-pentene and/or 1-octene. Exemplary alpha-olefins are selected from the group consisting of ethylene, butene, pentene-1,2-methylpentene-1,3-methylbutene-1, hexene-1,3-methylpentene-1, 4-methylpentene -1,3,3-dimethylbutene-1, heptene-1, hexene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1, and hexadodecene-1.

Polyolefins also include high density polyethylene, low density polyethylene, very low density polyethylene, linear low density polyethylene, or ethylene higher alpha-olefin copolymers; polypropylenes, including soft polypropylene, random copolymers, impact copolymers, or heterophasic polypropylene and thermoplastic vulcanized or TPV-based polypropylene; polybutenes, including poly 1-butene homopolymers and copolymers or polyisobutylene; octene, ethylene-propylene monomer or EPM, ethylene-propylene-diene monomer or EPDM and mixtures thereof.

Exemplary diene comonomer units include divinyl benzene, 1,4-hexadiene, 5-1,6-octadiene, 5-methyl-1,4-hexadiene, 3,7-dimethyl-1,6-octadiene, 1,3-cyclopentadiene, 1,4-cyclohexadiene, and dicyclopentadiene.

In a preferred embodiment, the polyolefin is a comonomer of ethylenes, propylenes and butenes.

The adhesive further comprises additional components, e.g., a tackifier. In one embodiment, the adhesive comprises from about 10 to about 50 wt % of a tackifier, based on the total weight of the adhesive. Exemplary tackifiers include natural and modified resins, polyterpene resins, phenol-modified hydrocarbon resins, aliphatic and aromatic hydrocarbon resins, hydrogenated hydrocarbons, hydrogenated resins and hydrogenated resin esters and rosins. Examples for rosins and its derivatives include wood rosin, tall oil, colophonium, gum rosin, wood rosin, rosin ester resins including its esters, hydrogenated or dehydrogenated forms; terpene resins include for example natural and synthetic terpenes, polyterpenes and terpenesters; aromatic or mixed aliphatic-aromatic tackifying resins, like polymers from cyclopentadiene, dicyclopentadiene; styrene resins, like copolymers from styrene, alpha-methyl styrene, vinyl toluene, methoxy styrene, tertiary butyl styrene, chlorostyrene; aliphatic resins from monomers 1,3-butadiene, cis-1,3-pentadiene, trans-1,3-pentadiene, 2-methyl-1,3-butadiene, 2-methyl-2-butene and other co-polymerizable monomers or aliphatic petroleum hydrocarbon resins.

Preferably, the tackifier has a softening point from about 80° C. to 150° C. (ring and ball method, measured by ASTM E28-58).

Optionally, waxes in quantities of 0 to about 10 wt % by weight can be added to the adhesive. The wax may be of natural or synthetic origin. Suitable natural waxes are vegetable waxes, animal waxes, mineral waxes or petrochemical waxes. Suitable chemically modified waxes are hard waxes, such as montan ester waxes, sarsol waxes, etc. Suitable synthetic waxes are polyalkylene waxes and polyethylene glycol waxes. Preferred waxes are petrochemical waxes, such as petrolatum, microwaxes and synthetic waxes, particularly polyethylene (PE) waxes, polypropylene (PP) waxes, optionally PE or PP copolymers, Fischer-Tropsch resins, paraffin waxes or microcrystalline waxes.

Additionally, up to about 10 wt % of a plasticizer can be added to the adhesive. Suitable plasticizers are medicinal white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof.

The adhesive may further comprise components such as fillers, antioxidants, adjuvants, adhesion promoters, natural waxes, synthetic waxes, oils, low molecular weight polymers, block, antiblock, pigments, processing aids, UV stabilizers, neutralizers, lubricants, surfactants nucleating agents, oxidized polyolefins, acid modified polyolefins, and/or anhydride modified polyolefins. Additives are combined with other adhesive components as individual components, in master batches, or combinations thereof. The selection and the properties are known to the person skilled in the art. They are added to the adhesive in quantities of typically up to about 3 wt % and preferably about 0.1 to about 2 wt %.

Preferably, the adhesive is a soft, semi-pressure sensitive adhesive, which has a needle penetration number of (i) 8 to 50 dmm after 1 hrs conditioning at 25° C., (ii) 10 or to 45 inch/mm after 4 hrs conditioning at 25° C., (iii) 10 to 40 dmm after 24 hrs conditioning at 25° C. More preferably, the adhesive has a needle penetration number of (i) 15 to 40 dmm after 1 hrs conditioning at 25° C., (ii) 15 or to 40 dmm after 4 hrs conditioning at 25° C., (iii) 10 to 30 dmm after 24 hrs conditioning at 25° C.

Unlike highly crystalline adhesives, high content APAO adhesives do not have a recrystallization temperature upon cooling. Such APAO based adhesives have cold crystallization temperature, and any adhesives that have a cold crystallization temperature may be utilized in the described process to form non-blocking, free flowing pellets. While there are various methods known in the art to determine the cold crystallization temperature (Tc), the Tc values reported herein are determined by Differential Scanning calorimeter (DSC). The adhesive is first heated to above its melting temperature to remove any prior heating history, and then cooled to below its glass transition temperature (Tg). The slow crystallization rate of APAO based adhesive keeps the adhesive in an amorphous state during the cooling DSC scan. As the amorphous adhesive is slowly heated to above its glass transition temperature in a second heating DSC scan, the amorphous regions of the adhesive has sufficient kinetic energy and freedom of motion to arrange themselves into a crystalline form. The exothermic peak observed in the second heating scan is determined as the cold crystallization temperature. While not being bound to any specific theory, it is believed that cold crystallization increases the crystallinity of the adhesive and therefore enhances the hardness and strength of the adhesive.

In a preferred embodiment, the cold crystallization temperature of the adhesive ranges from about 82 to about 104° F. (about 28 to about 40° C.).

The process for preparing agglomeration resistant particles comprises melting an amorphous adhesive at an elevated temperature, and then cutting the adhesive into a plurality of pellets either in a cooling fluid or immediately immersed in the cooling fluid. The equipment may be set up so the die plate is immersed in the cooling fluid or just above the cooling fluid. In one embodiment, the adhesive is extruded through an orifice of a die plate directly in the cooling fluid.

The cooling fluid has a first temperature, T1, of less than about 45° F. (7.2° C.). The lower limit depends on the fluid, e.g., for water, the lower limit of the cooling fluid is about 33° F. (0.5° C.), and must be above the freezing point of the cooling fluid. The cooling fluid comprises water, glycol, liquid nitrogen, compressed carbon dioxide or the like. The cooling fluid may further comprise antiblock compositions that inhibit particle blocking, i.e., caking, agglomerating, aggregating and/or sticking, when at least partially coated on the surface of particles in a sufficient amount. Antiblock compositions include powders, silicones, surfactants, waxes, polymers, and combinations thereof.

Antiblock compositions include organic or inorganic compounds such as those selected from the group consisting of talc, mica, calcium carbonate, finely divided or fumed silica, organic acids, metal organic esters, cellulose derivatives, alumina trihydrate, marble dust, cement dust, clay, feldspar, alumina, magnesium oxide, magnesium hydroxide, antimony oxide, zinc oxide, barium sulfate, aluminum silicate, calcium silicate, titanium dioxide, titanates, chalk, polymers such as polyethylene, polypropylene, polystyrene, and combinations thereof. The antiblocking compositions may be employed in any form; however, powders are generally preferable.

Typically, once the pellets are cut, they are transported away from the orifice to prevent from interfering with the continuous extrusion/pelletizing process. The pellets may be transported away by the orifice by various means known in the art, e.g., gravity feed, process water flow, and the like. As known to those skilled in the art, depending upon the size and speed of the pelletizer, the process water flow varies from about 35 gpm to about 350 gpm.

The pellet adhesives are then recrystallized/solidified in a recrystallization fluid having a second temperature, T2. Depending on the adhesive, the recrystallization fluid temperature can vary. In one embodiment, the recrystallization fluid has a T2 range of about 77 to about 105° F. (about 25 to about 41° C.). In a preferred embodiment, recrystallization fluid has a T2 range of about 82 to about 104° F. (about 28 to about 40° C.).

In contrast to conventional techniques that shock or decrease the overall temperature of the pellets to force recrystallization, the present process exposes the pellets to higher recrystallization temperature to speed up the solidification process. In the preferred process, the pellets remain in the recrystallization fluid with the specified T2 for a minimum of about 30 minutes, preferably at least 100 minutes.

The pellets harden and recrystallize in the recrystallization fluid at speeds at least three times faster than the conventional process, and the pellets have sufficient hardness or sufficient low deformation after about 40, preferably 120 minutes, in the recystallization fluid.

The recrystallization fluid comprises water, glycol, liquid nitrogen, compressed carbon dioxide, and the like. The recrystallization fluid may also include antiblock compositions.

The recrystallized pellets are then separated from the recrystallization fluid and dried. After drying, the recrystallized pellets are, optionally, dusted and coated with dry antiblock compositions.

The shape of the pellets can be varied according to the manufacturing process. They can have the form of small pillows, preferably a spherical form like balls, or in another preferred embodiment they form a cylindrical shape. In such case the dimensions are different in each direction, for example in one direction 25 mm with a diameter of 2 to 10 mm. The form of the pellets is not required to be regular, e.g., a spherical form can be compressed or stretched, rods can be symmetrical or have a non regular form as long as the size of the granulates is not too large. The form will be influenced by the manufacturing process, for example the pellets are squeezed, cut and separated to give a partly round form. It is possible but not preferred to mix different forms and sizes of the pellets. Another aspect of the invention is related to the size of the pellets. In one embodiment, the pellets have a weight greater than about 5 mg, and less than about 200 mg each, preferably less than about 100 mg most preferred less than about 80 mg. Smaller particle size increases the flowing properties of the material.

In general, polymers that comprise primarily amorphous or semicrystalline morphology produced in conventional manner typically yield soft pellets. The soft pellets tend to agglomerate upon long term storage and elevated temperature. The pellets according to the invention show free flowing properties at a temperature up to 120° F. This free flowing property remains stable also after storage at elevated temperature.

While conventional process hold the pellets in the cooling fluid to force recrystallization, the present process solidifies the pellets at a temperature at least 30° F. greater than the cooling fluid. Surprisingly, this present process increases the speed of the adhesive solidification by at least a factor of three. Furthermore, the adhesive pellets made from the present process have percent deformation values that are at least three times lower than the pellets made from the conventional method, even only after recrystallizing for about 120 minutes.

The following examples are provided to describe the invention in further detail. These examples, which set forth a preferred mode presently contemplated for carrying out the invention, are intended to illustrate and not to limit the invention.

EXAMPLES

Example 1

Needle Penetration of Adhesive

The adhesive samples were conditioned at 25° C. for various times and then the needle penetration values were measured in accordance with ASTM D1321 with a penetrometer. The results are shown in Table 1.

TABLE 1

| Needle penetration | | | |
| --- | --- | --- | --- |
| Adhesive | 1 hr (dmm*) | 4 hr (dmm*) | 24 hr (dmm*) |
| Sample A (APAO adhesive having >50% polypropylene-polybutene copolymer) | 32 | 22 | 19 |
| Sample B >50% APAO (APAO adhesive having >50% polypropylene-polybutene copolymer) | 33 | 36 | 27 |
| Sample C (>50% APAO (APAO adhesive having >50% polypropylene-polybutene copolymer) | 23 | 18 | 16 |
| Comparative Sample D (TECHNOMELT ® SUPRA TS 100, high crystalline adhesive) | 4 | 3 | 3 |
| Comparative Sample E (TECHNOMELT ® EASY-PAC 200, high crystalline adhesive) | 5 | 4 | 2 |

*1 dmm = 0.1 mm

Samples A, B and C have higher needle penetration values than comparative samples D and E, indicating that Samples A, B and C are softer than the firmer comparative samples D and E. Comparative samples D and E can be readily pelletized due to their low needle penetration values. It is typically understood in the art that softer or semi-pressure sensitive adhesives are more difficult to produce non-blocky pellets.

Example 2

Peak Recrystallization Temperature Determination

The cold crystallization temperatures of the adhesives were determined by Differential Scanning calorimeter (DSC), and are summarized in Table 2. Each adhesive was melted at 10° C./min up to 180° C., then cooled at 10° C./min to −50° C. and held at −50° C. for 10 minutes. The adhesive was then re-heated at 3° C./min until 180° C. Using the DSC Universal V4.5A TA Instrument software, the cold crystallization peak (Tc) was determined to be the peak exothermic temperature of the second DSC heating.

TABLE 2

| Cold crystallization Peak Temperature | |
| --- | --- |
| Adhesive | Cold Crystallization Temperature (° C.) |
| Sample A | 38 |
| Sample B | 25 |
| Sample C | 35 |

TABLE 2-continued

Cold crystallization Peak Temperature

| Adhesive | Cold Crystallization Temperature (° C.) |
|---|---|
| Comparative Sample D | None |
| Comparative Sample E | None |

Figure 1B:
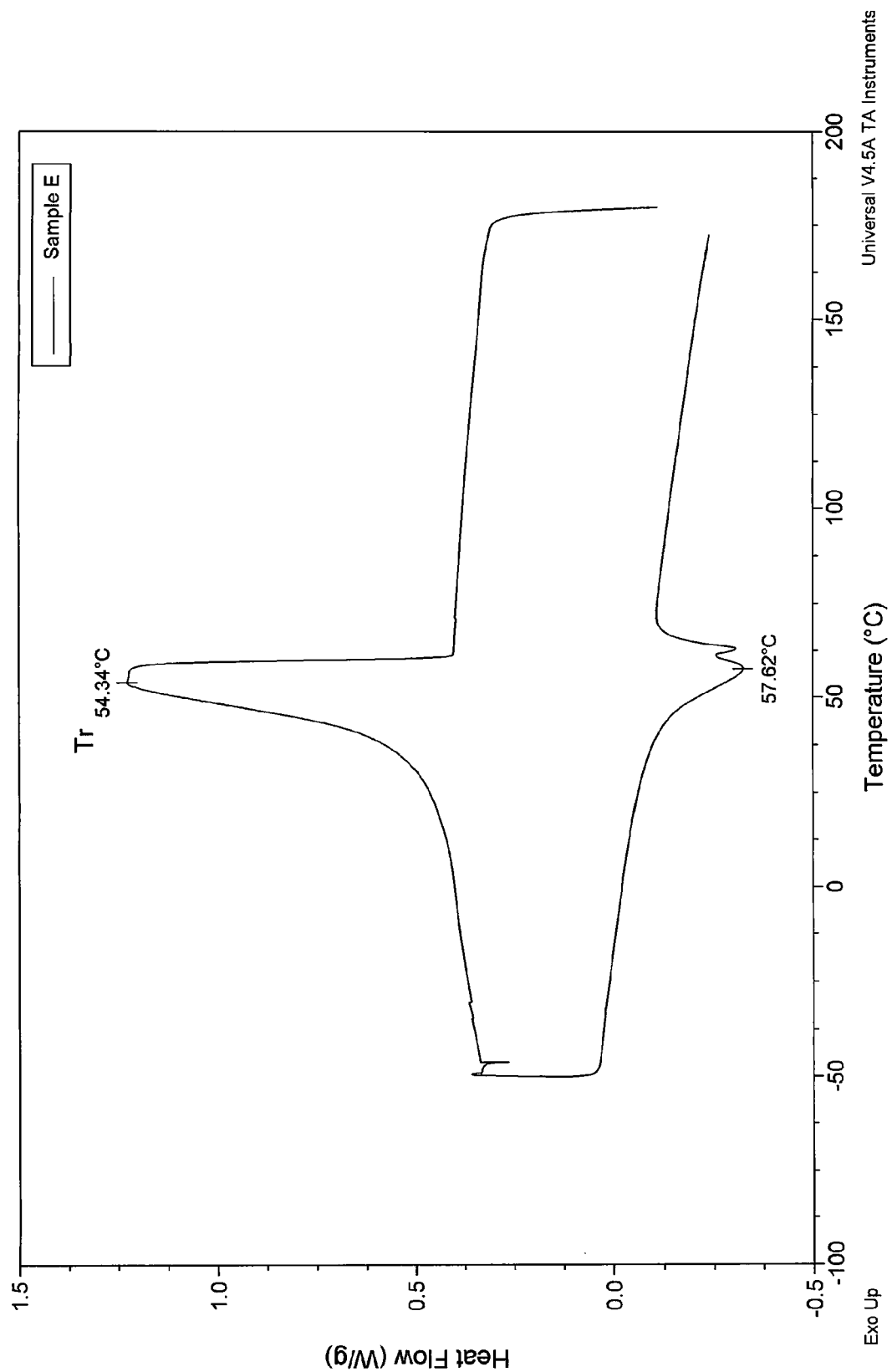

The resultant curve, cooling and second heating for Sample A and Sample E are shown in FIGS. 1A and 1B, respectively. Samples A, B and C do not have a recrystallization temperature (Tr) during cooling. Only upon second heating, a cold crystallization temperature is shown for samples A, B and C. Unlike Samples A, B, and C, Comparative Samples D and E recrystallized readily upon cooling.

Example 3

Adhesive Pellets were produced by a pilot pelletizer with the following process:
1. APAO based Adhesive (APAO adhesive having >50% polypropylene-polybutene copolymer) was loaded in an agitated heated mix tank and melted at 175° C.
2. The molten adhesive was forced through an orifice (size 2.8 mm) and cut in a cooling water stream. The cooling water stream contained water T1 (4° C.), with a flow rate of about 55 to about 65 gpm to move the pellets down the stream. The cooling tank also contained 1.0% antiblocking agents. The pellets flowed into an agitated recrystallization/solidification tank.
3. The agitated recrystallization/solidification tank comprised of water and 1.0% antiblocking agents. The temperature of the recrystallization/solidification tank was set to T2 of 35° C.
4. The pellets remained in the recrystallization/solidification tank for about 120 minutes.

Example 4

Dynamic Time Sweep Test

Figure 2:
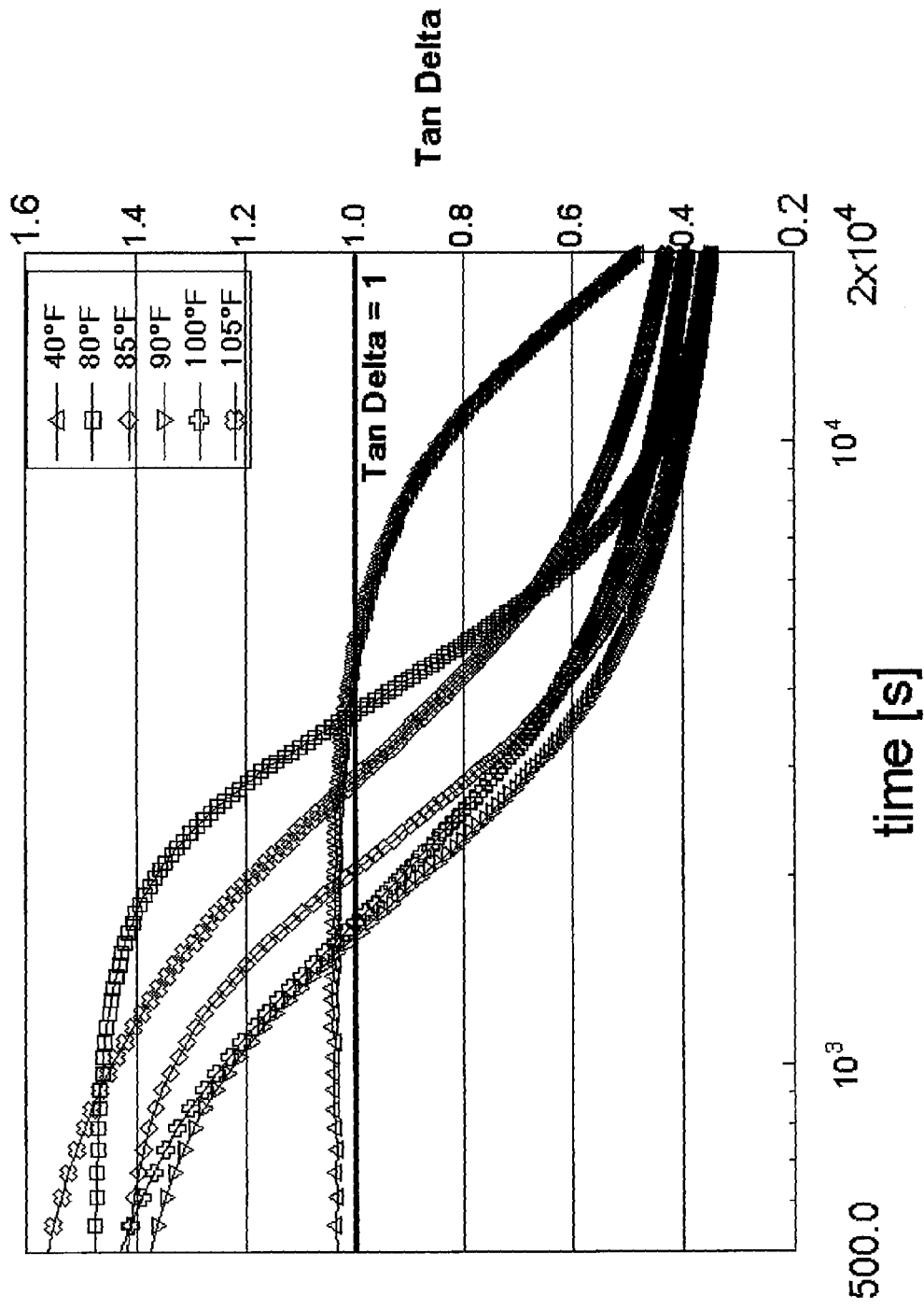
FIG. 2 is a Dynamic Time Sweep test of adhesive pellets recrystallized in various temperatures.

Time sweep curve of pellets recrystallized/solidified in various T2 temperatures were tested. Dynamic Time Sweep program in ARES M was run for each pellet samples. The pellet samples were heated at application temperature (150° C.) between two parallel plates and rapidly cooled to designated recrystallization/solidification temperature (40, 80, 85, 90, 100 or 105° F.) and was held at for 24 hours (hrs). Frequency of 10 rad/sec is applied with constant strain of 1.0% and the modulus was recorded over the time. Tan delta value against time is shown in FIG. 2. The temperature where Tan Delta=1 depicts the turning point of the adhesive as liquid into solid (values greater than Tan Delta=1 depicts liquid-like adhesive, and values less than Tan Delta=1 depicts solid-like adhesive).

As shown in FIG. 2, recrystallizing the pellets at the conventional recrystallization temperature (40° F.) required significantly longer time period to cross the Tan Delta=1 value, whereas solidifying the pellets at 90° F. increased the speed of solidification by at least a factor of three. Also, the pellets solidified significantly faster when the pellets recrystallized at 90° F. than the conventional process.

Example 5

Residence Time to Reach Tan Delta=1 from Time Temperature Sweep Test

Based on the Time Temperature Sweep test, the residence time it took to achieve Tan Delta=1 is summarized in Table 3.

TABLE 3

Residence Time

| Adhesive | Temperature (° F.) | Holding time to reach Tan δ = 1 (sec) |
|---|---|---|
| Sample A | 40 | 4630 |
|  | 80 | 3670 |
|  | 85 | 2051 |
|  | 90 | 1631 |
|  | 100 | 1691 |
|  | 105 | 2890 |
| Sample B | 77 | 1090 |
|  | 85 | 791 |
|  | 90 | 491 |
| Sample C | 77 | 1211 |
|  | 85 | <100 |
|  | 95 | 491 |

As shown in Table 3, solidifying the Sample A at temperatures at or above 80° F. decreased the holding time to reach Tan Delta=1 by at least 20%. Moreover, increasing the T2 to above 85° F. and lower than 105° F., maximizes the speed of the solidification process.

Example 6

Deformation/Hardness

Sample A pellet hardness was examined by measuring the percent deformation of pellets solidified in various T2 fluid temperatures. Pellet deformation was examined by measuring the initial diameter ($d_0$) with a modified micrometer (with magnets and steel). A weight of 70 g was place on the pellet for one minute and then the new diameter ($d_1$) was measured. The percent difference, $(d_0-d_1)/d_0 \times 100\%$, was calculated for at least twelve pellet samples and the percent deformation against recrystallization fluid temperatures are shown in FIG. 3.

Figure 3:
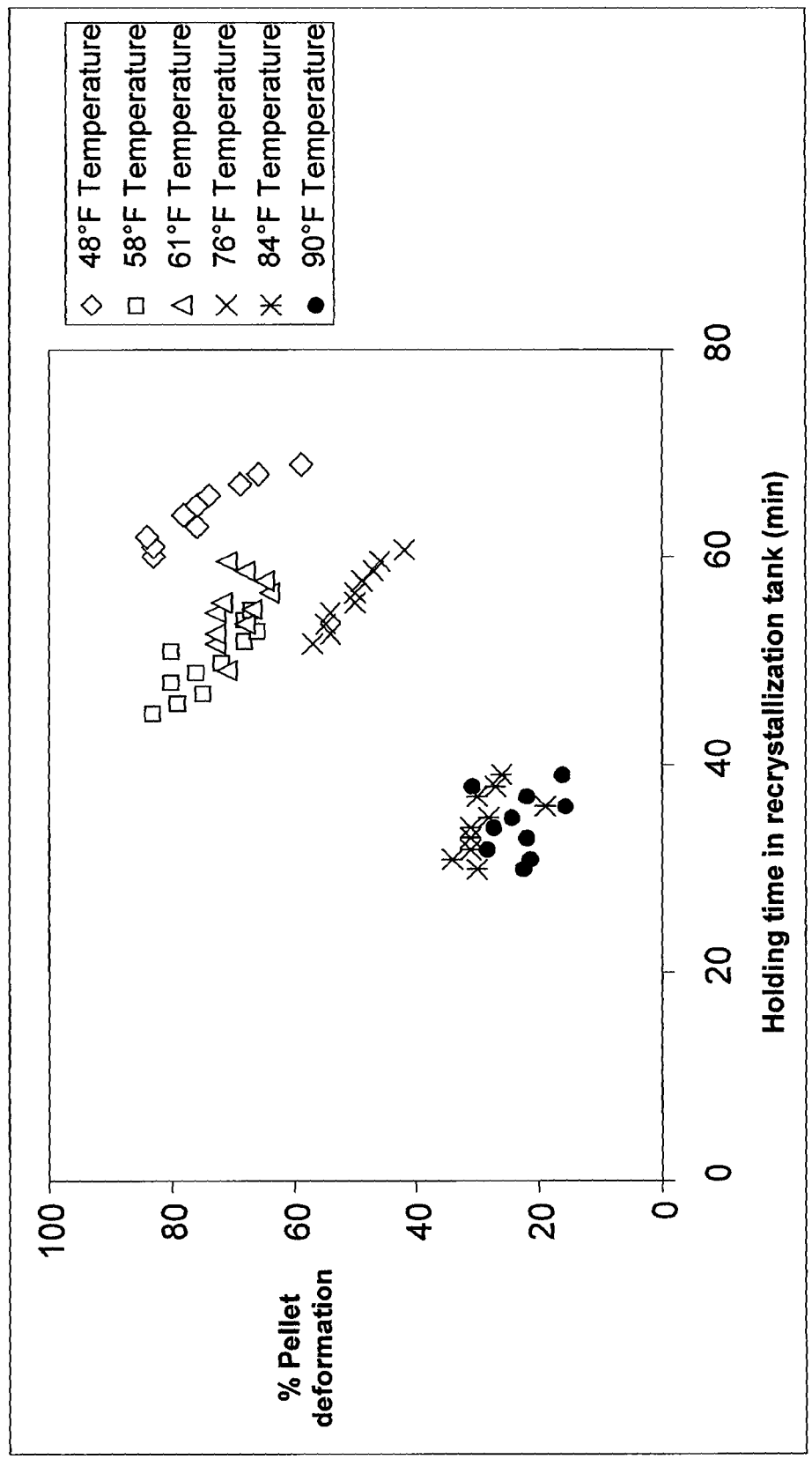
FIG. 3 shows deformation percentage of adhesive pellets recrystallized in various temperatures.

FIG. 3 demonstrates that the average deformation is the smallest when the pellets are solidified at T2 of 85° F. and 90° F. Pellets that were solidified at 90° F. achieved a deformation of less than about 30% even only after about 40 minutes. In fact, majority of the pellets achieve a deformation of less than about 20% only after about 40 minutes when recrystallized at 90° F. In contrast, pellets that were solidified in temperatures of 48° F. to 76° F. had a deformation range of about 60 to about 80%, even when recrystallized greater than 60 minutes.

Also, as shown in FIG. 3, pellets solidified at significantly faster, with lower deformation, at 85° F. and 90° F. than solidified at lower temperature ranges.

Example 7

Blocking

Blocking was measured by placing about 950 g weight evenly distributed on top of about 200 g of pellets made from Sample A solidified in various temperatures. The entire set-up was then transferred to 120° F. oven for 24 hrs. The set-up was then removed and cooled to room temperature (about 20° C.). The pellets were then visually and manually observed. A rating of "fail" was given if the adhesive was blocked, and a rating of "pass" was given to adhesive that was completely unblocked.

TABLE 4

Blocking results of sample A at various process conditions

| Adhesive | Process Conditions | Blocking Observation | Rating |
|---|---|---|---|
| Sample A | T2 = 40° F., with surfactants | Completely Blocked | Fail |
| Sample A | T2 = 60° F., with surfactants | Partially unblock after 24 hrs | Fail |
| Sample A | T2 = 90° F., with surfactants | Completely unblock after 2 hrs | Pass |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A process for forming a plurality of hot melt adhesive pellets comprising the steps of:
   a) extruding an adhesive through an orifice of a die plate immersed in a cooling fluid, which has a temperature T1;
   b) cutting the adhesive into a plurality of pellets in the cooling fluid;
   c) solidifying the pellets in a recrystallization fluid at temperature T2 for at least 30 minutes and up to 24 hours;
   d) separating the pellets from the recrystallization fluid and drying the pellets;
   wherein the T1 is less than about 45° F. and the T2 is higher than T1 by at least 30° F.
   wherein the adhesive comprises an amorphous poly-alpha-olefin polymer having a cold crystallization temperature;
   wherein the adhesive has a needle penetration number of (i) 8 to 50 dmm after 1 hour conditioning at 77° F., (ii) 10 to 45 dmm after 4 hour conditioning at 77° F., and (iii) 10 to 40 dmm after 24 hour conditioning at 77° F.; and
   wherein the pellets have an average percent deformation, $(d_0-d_1)/d_0 \times 100\%$, less than 40%, where $d_0$ is an initial diameter and $d_1$ is a diameter measured after applying a weight of 70 g for one minute.

2. The process of claim 1 wherein the T2 has a temperature range of about 77° F. to about 104° F.

3. The process of claim 2 wherein the T2 has a temperature range of about 86° F. to about 95° F.

4. The process of claim 1 wherein the pellets are held in the recrystallization fluid for at least about 60 minutes up to about 180 minutes.

5. The process of claim 4 wherein the pellets are held in the recrystallization fluid for at least about 100 minutes up to about 150 minutes.

6. The process of claim 1 wherein the amorphous alpha-olefin polymer comprises a comonomer of ethylene, propylene, butene, pentene, hexane, heptene, octane, nonene, decene, undecene, dodecene, and mixtures thereof.

7. The process of claim 6 wherein the amorphous alpha-olefin polymer comprises a comonomer of propylene and butene.

8. The process of claim 1 wherein the adhesive has a needle penetration number of (i) 15 to 40 dmm after 1 hour conditioning at 77° F., (ii) 15 to 40 dmm after 4 hour conditioning at 77° F., and (iii) 10 to 30 dmm after 24 hour conditioning at 77° F.

9. The process of claim 8 wherein the adhesive has a cold crystallization temperature of about 77° F. to about 105° F.

10. The process of claim 9 wherein the adhesive has a cold crystallization temperature of about 82° F. to about 104° F.

* * * * *